(12) United States Patent
Kühlmeier

(10) Patent No.: US 7,887,292 B2
(45) Date of Patent: Feb. 15, 2011

(54) METHOD FOR CONDITION MONITORING A ROTOR OF A WIND ENERGY PLANT

(75) Inventor: Lennart Kühlmeier, Ringkobing (DK)

(73) Assignee: Vestas Wind Systems A/S (DK)

(*) Notice: Subject to any disclaimer, the term of this patent is extended or adjusted under 35 U.S.C. 154(b) by 0 days.

(21) Appl. No.: 12/560,831

(22) Filed: Sep. 16, 2009

(65) Prior Publication Data
US 2010/0021297 A1    Jan. 28, 2010

(51) Int. Cl.
*F03D 7/04* (2006.01)

(52) U.S. Cl. ............................ 416/1; 416/38; 416/48; 416/61

(58) Field of Classification Search ............ 416/1, 416/31, 38, 47, 48, 61; 29/44, 55
See application file for complete search history.

(56) References Cited

U.S. PATENT DOCUMENTS

| | | | |
|---|---|---|---|
| 6,619,918 B1 * | 9/2003 | Rebsdorf | 416/1 |
| 6,940,185 B2 * | 9/2005 | Andersen et al. | 290/44 |
| 6,940,186 B2 * | 9/2005 | Weitkamp | 290/44 |
| 7,072,784 B2 | 7/2006 | Wobben | |
| 7,160,083 B2 * | 1/2007 | Pierce et al. | 416/61 |
| 7,322,794 B2 * | 1/2008 | LeMieux et al. | 416/40 |
| 2005/0090937 A1 | 4/2005 | Moore et al. | |
| 2005/0276696 A1 | 12/2005 | LeMieux | |
| 2006/0041368 A1 | 2/2006 | Williams et al. | |

FOREIGN PATENT DOCUMENTS

| | | |
|---|---|---|
| DE | 19628073 C1 | 9/1997 |
| DE | 10065314 A1 | 7/2002 |
| WO | 2006012827 A1 | 2/2006 |

OTHER PUBLICATIONS

International Preliminary Report on Patentability; PCT/DK2008/000108; May 15, 2009; 12 pages.
International Search Report; PCT/DK2008/000108; Jun. 16, 2008; 2 pages.

* cited by examiner

*Primary Examiner*—Igor Kershteyn
(74) *Attorney, Agent, or Firm*—St. Onge Steward Johnston & Reens LLC

(57) ABSTRACT

A method for condition monitoring a rotor of a wind energy plant includes the steps of measuring activity signals of the blades in the rotor and establishing one or more differential values between the activity signals of different blades. The one or more differential values are used for monitoring the condition of the rotor in the wind energy plant. A wind energy plant, a cluster of wind energy plants and use hereof is also contemplated.

23 Claims, 7 Drawing Sheets

METHOD FOR CONDITION MONITORING A ROTOR OF A WIND ENERGY PLANT

CROSS-REFERENCE TO RELATED APPLICATIONS

The present application is a continuation of pending International patent application PCT/DK2008/000108 filed on Mar. 14, 2008 which designates the United States and claims priority from Danish patent application PA 2007 00403 filed on Mar. 16, 2007, the content of which is incorporated herein by reference.

FIELD OF THE INVENTION

The invention relates to a method, a wind turbine and a cluster of wind turbines.

BACKGROUND OF THE INVENTION

The use of condition monitoring systems for wind turbines has increased significantly in the recent years as the main wind turbine components have increased in size and the components are also designed closer to the material limits.

It is possible with a condition monitoring system to continuously detect the activity of wind turbine components such as the wind turbine blades during normal use. Abnormalities in the function of the wind turbine component may be detected early, such as damage or wear to the component and removed in time before a full breakdown of the component.

A problem with the known condition monitoring systems is the fact that complexity of the wind turbine components makes it difficult to establish reliable reference curves to compare the measured values with.

An example of a known condition monitoring system for a wind turbine is disclosed in U.S. Pat. No. 7,072,784.

Consequently, it is necessary to provide the condition monitoring system with a large margin in order to compensate and ensure that any abnormality is detected. The condition monitoring system may however easily become imprecise with the compensation margin and thus cause a number of false alarms.

Further it is a problem that the many different sizes and types of wind turbine components require a significant database of reference curves in order to successfully apply condition monitoring systems to all modern wind turbines.

It is an object of the present invention to provide solutions for wind turbines without the abovementioned disadvantages in the prior art.

SUMMARY OF THE INVENTION

The invention provides a method for monitoring a rotor of a wind energy plant, said method comprising the steps of:
  measuring activity signals of the blades in said rotor,
  establishing differential values between the activity signals of different blades, and
  wherein the differential values are used for monitoring the condition of the rotor in the wind energy plant.

Hereby is achieved an advantageous method for making the decision whether the wind energy plant rotor is healthy/in good condition or not. Especially is established a method which does not explicitly depend on individual signal composition, intensity or activity by utilizing differences in response of the individual blades.

All blades on a wind energy plant can be said to operate in the same environment, i.e. over one entire turn they see roughly the same external loads (wind, rain, temperature etc.). Moreover, since they are manufactured with the same specifications, they should have equal strength to withstand the loads. So if the loading is the same and the blades have equal strength and are in good condition no difference in the response from the individual blade is to be expected.

In order to be able to identify the condition of the wind energy plant rotor, known techniques, e.g. where measured values are compared to known reference values, requires a comprehensive database of various reference values for substantially all load situations. Said database is very difficult to obtain. An advantage of the invented method is that it does not require the existence of obtained reference values.

In an aspect of the present invention activity signals are measured with acoustic sensors in contact with the structural means of the rotor e.g. the strengthening structure of blades. Hereby is achieved an advantageous embodiment of the invention as the measured structural vibrations provide a picture of blade health condition.

In yet another aspect of the invention said structural means of the rotor comprises one or more rotor blade pitch bearings. Hereby it is ensured that measurements can be obtained directly from the pitch bearings indicating the condition of said bearings. It is furthermore ensured that any acoustic emitted signals coupled to the pitch bearings from the rotor blades can be measured.

In another aspect of the present invention said monitoring is performed continuously, with predefined intervals and/or initiated in response to a detected abnormal situation. Hereby are achieved advantageous embodiments of the invention including the possibilities of only periodically condition monitoring the rotor health instead of continuously or only when detecting a change from normal values. Further, it is possible to combine the different method steps e.g. continuous control during high rotor load and periodic control in lower load periods in order to especially monitor the condition of the rotor when most needed.

In a further aspect of the present invention the abnormal situation is detected in at least one physical work property of at least one component of said wind energy plant such as acoustic emission, temperature and/or electric values. Hereby is it possible to activate a condition monitoring check when other sensor values, e.g. in other parts of the wind energy plant, indicate that something may be wrong with the rotor.

In an even further aspect of the present invention activity signals are averaged or integrated over a time period before differential values are established. The activity signals are not in synchronism as the blades are displaced in relation to each other by an angle of typically 120 degrees or 180 degrees in 3- or 2-bladed rotor respectively. The activity signal of a blade varies over one rotation as the blade passes different surroundings in the rotation including the tower which may increases the signal level in relation to the blade at the highest point.

In an aspect of the present invention activity signals are time delayed before differential values are established. Hereby it is possible to synchronise the activity signals of the different blades (by moving some activity signals a time period corresponding to 120 degrees or 180 degrees) before the differential values are established.

However, it shall be emphasised that the difference between activity signals may be established directly by ignoring the few peak differences or levelling the differential signal instead.

In another aspect of the present invention, the results of said rotor differential values are compared with a predefined value in order to establish whether the blades have similar activity signals or not. As small differences between the rotor blades always are present it is advantageous to introduce a predefined value which defines when a difference is within a normal range of blades.

In a further aspect of the present invention, a number of acoustic sensors measure the condition of a blade when a differential value is above the predefined value for said blade. By the distributed sensors it is possible to detect the position of the blade problem which causes a differential value above the predefined value e.g. a defect in the blade surface or in a pitch bearing that gives an activity signal different from the other blades within the rotor. For monitoring specific areas, components etc. they may be instrumented separately.

In another aspect of the present invention, comparison between all differential values is performed. As established differential values indicates a possible abnormality in one of the rotor blades on which the activity signals have been measured, a comparison between all established differential values ensures that the specific rotor blade on which abnormal values have been measured, can be detected and pointed out. This in turn ensures that fewer measurements are required afterwards in order to locate the exact origin of the rotor blade problem.

The invention also relates to a method for controlling a rotor of a wind energy plant, said method comprising the steps of:
  measuring activity signals of the blades in said rotor, and
  establishing one or more differential values between the activity signals of different blades,
  wherein said one or more differential values are used for monitoring and/or controlling the rotor in the wind energy plant.

Hereby it is ensured that the wind energy plant is monitored and/or controlled on basis of said measured activity signals whereby parameters of the wind energy plant such as loads on rotor blades and/or loads on pitch bearings can be controlled accordingly. Furthermore it is ensured that said wind energy plant can be controlled e.g. closed down for service if said monitoring indicates conditions of the wind energy plant that can cause a safety problem.

In another aspect of the present invention, a wind energy plant control system controls the plant in response to results of said rotor differential values e.g. by individually pitching one or more blades. Hereby it is possible to control and operate the wind energy plant in non-symmetric manner in order to put less load on the weaker components. Especially it is possible to adapt the pitch signal for a blade of a wind energy plant rotor in relation to the condition of the blade e.g. establish a less demanding pitch strategy for a blade if the health results of the blade is lesser than the other blades in the rotor.

The invention also relates to a wind energy plant comprising
  a wind energy plant rotor including at least two blades,
  measuring means for measuring activity signals of said blades, and
  means for establishing one or more differential values by comparison between said activity signals,
  wherein said one or more differential values are used in means for controlling the rotor of the wind energy plant.

Hereby is achieved advantageous means for making the decision whether the wind energy plant rotor is healthy/in good condition or not. Especially is established means which does not explicitly depend on individual signal composition, intensity or activity by utilizing differences in response of the individual blades. Further the means for controlling of the rotor is independent of the type of blades and the blades may be retrofitted with new blades without that the means for controlling needs recalibration.

In an aspect of the present invention said measuring means are one or more acoustic sensors e.g. positioned in contact with the structural means of the rotor such as the strengthening structure of blades or in proximity of the blades of the wind energy plant rotor or combinations hereof. Hereby it is ensured that specific and accurate activity signals of acoustic emission may be detected by following the rotor directly or by being in close proximity of the blades.

In a further aspect of the present invention one or more acoustic sensors are positioned in each blade of the wind energy plant rotor e.g. one or more piezoelectric sensors. Hereby it is ensured that acoustic emission of the blade is detected and with no or very little noise from other sources.

In an even further aspect of the present invention one or more acoustic sensors are positioned inside the hub of the wind energy plant rotor and e.g. sensing acoustic sounds of the blade root section. Hereby it is ensured that among acoustic emissions of the blade emissions from the pitch bearing may especially be monitored e.g. in combination with acoustic emission sensors inside the blade.

In an aspect of the present invention each blade comprises a plurality of acoustic sensors and preferably between 10 and 50 sensors. Hereby it is ensured that the required amount of acoustic sensors is present to monitor every desired area of a blade.

In another aspect of the present invention each blade comprises rows of connected acoustic sensors e.g. between 2 and 5 rows with approx. 10 sensors in each row and where the sensors preferably are separated with a distance of 3 meters or less from each other. Hereby it is possible to establish an advantageous structure of sensors monitor a blade.

In aspects of the present invention a row substantially extends from the blade root to the blade tip and a row is distributed in the region of the trailing and leading edge and the suction and pressure side, respectively.

In another aspect of the present invention said means for controlling is part of the wind energy plant control system e.g. as a condition monitoring system and/or as a part of the rotor control system. Hereby it is achieved that the differential value may be used in different situations such as; to monitor the blade health situation as a passive blade control functionality, to initiate the detection of a position of a problem in the blade causing a differential value, and/or to actively control the blade e.g. with individual pitch as a result of a differential value.

In a further aspect of the present invention said rotor control system individually pitches the blades in response to said differential values between the blades.

In an even further aspect of the present invention said plant comprises means for comparison between all differential values.

The invention also relates to a cluster of wind energy plants comprising at least two wind energy plants according to any of the above-described embodiments. Hereby is an advantageous embodiment of the invention achieved.

In an aspect of the present invention the wind energy plants are controlled by a distributed control system e.g. a SCADA system. Hereby it is possible to condition monitor a number of wind energy plants from a control centre such as a wind park control centre or a control centre of a utility grid operator.

The invention also relates to use of the method for monitoring the condition of blades and/or pitch mechanisms of a wind energy plant rotor and for establishing individual pitch values for blades in a wind energy plant rotor.

BRIEF DESCRIPTION OF THE DRAWINGS

The invention will be described in the following with reference to the figures in which.

DETAILED DESCRIPTION OF THE INVENTION

Figure 1:
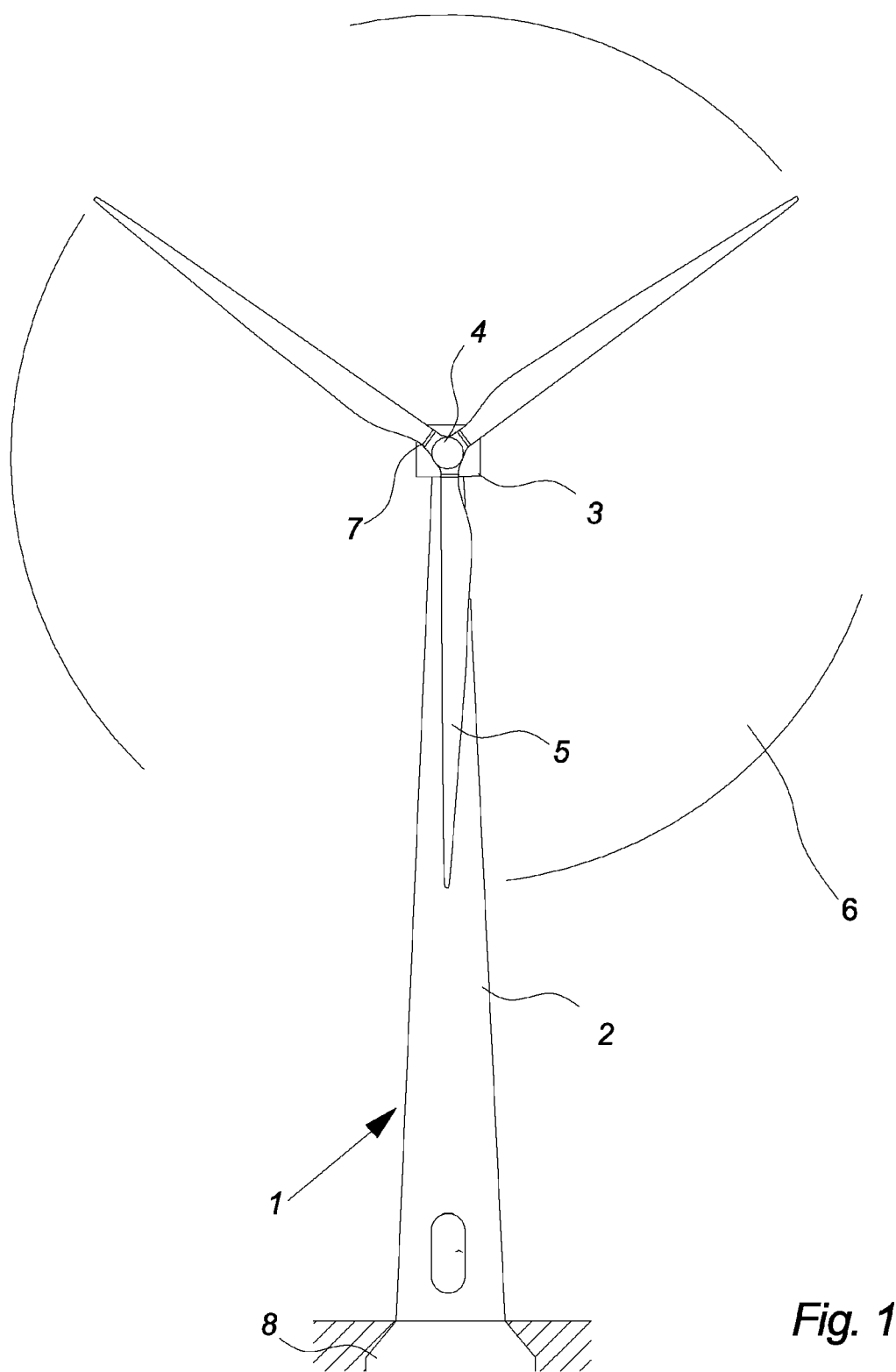
FIG. 1 illustrates a front view of a wind energy plant.

FIG. 1 illustrates a front view of a modern wind turbine 1 with a tower 2 positioned on a foundation 8. A wind turbine nacelle 3 and hub 4 is positioned on top of the tower.

The wind turbine rotor 6, comprising at least one blade such as two or three wind turbine blades 5 as illustrated, is connected to the wind hub 4 through pitch mechanisms 7. Each pitch mechanism includes a blade bearing and pitch actuating means which allows the blade to pitch.

Figure 2:
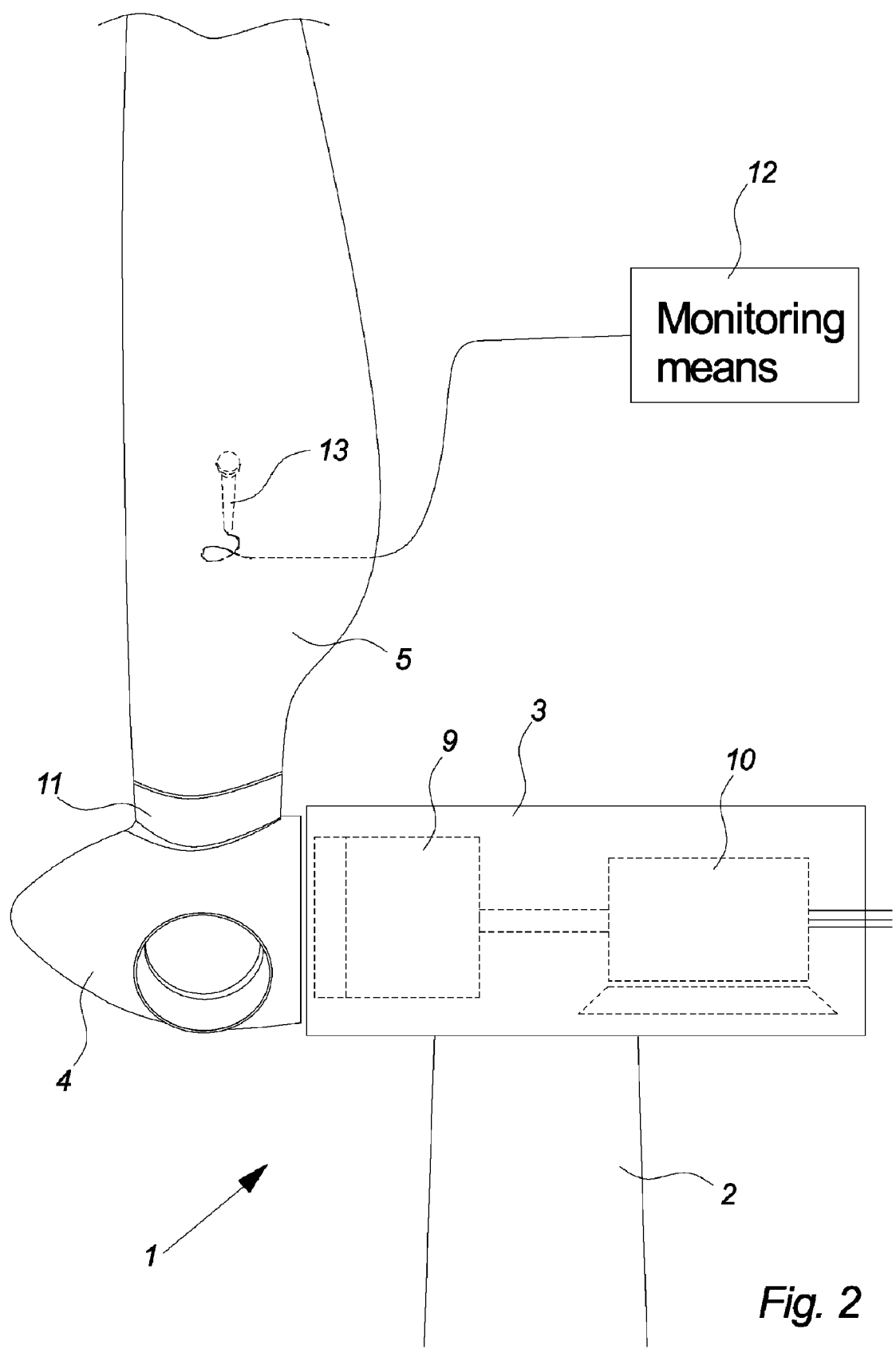
FIG. 2 illustrates schematically main components of a wind energy plant and an embodiment of a condition monitoring system according to the invention for the plant.

FIG. 2 illustrates schematically main components of a wind energy plant and an embodiment of a monitoring system according to the invention. The main components include the rotor blades 5, gearbox 9 and the generator 10 illustrated with an electric connection to a utility grid.

The monitoring system comprises monitoring means 12 electrically connected to acoustic emission measuring means 13 such as acoustic emission sensors or structure coupled microphones. The acoustic emission measuring means 13 receives structure coupled acoustic signals originated from and transmitted by the structures of a wind turbine rotor blade 5 and/or connected components to the blade 5.

For one embodiment of the invention said structure coupled microphones can be piezoelectric sensors.

Structural components of the blade 5 can be e.g. strengthening structure, base frame, glass-fibre surface structure etc.

Connected components can be e.g. pitch bearings, blade pitch mechanism, lightning receptors, lightning down conductor etc.

For different embodiments of the invention, monitoring means 12 can be located e.g. in the rotor blade 5, in the hub 4 of the wind turbine or in the nacelle 3.

For further embodiments of the invention said monitoring means 12 is connected to an energy plant control system as to supply information to said system regarding the condition of the wind energy plant.

Figure 3:
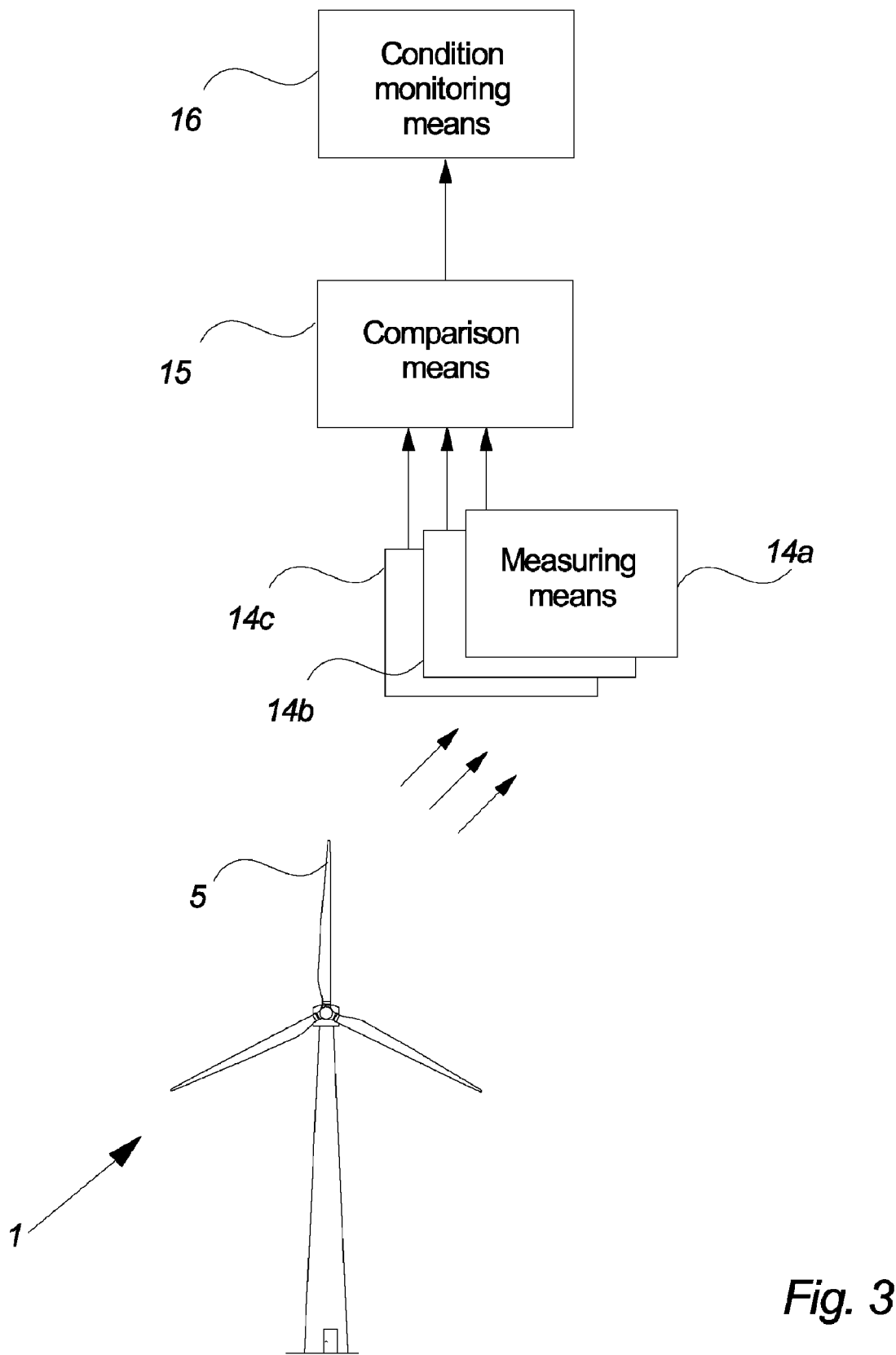
FIG. 3 illustrates method steps of a condition monitoring system according to the invention for a wind energy plant.

FIG. 3 illustrates method steps of a condition monitoring system according to the invention for a wind energy plant.

Values of activity signals such as acoustic generated and emitted signals from rotor blades or rotor blade structures, indicating the condition of components of the wind energy plant are measured on each rotor blade 5 by measuring means 14a-c such as acoustic emission sensors or structure coupled microphones.

For one embodiment of the invention said values are compared by comparison means, such as cross comparing values from 14a to values from 14b, values from 14a to values from 14c and/or values from 14b to values from 14c. This comparison of parameters can be direct i.e. a comparison of direct measured values of activity signals or can be indirect such as comparing filtered or integrated values and/or comparing secondary values such as average or integrated values, values of variation etc.

For further embodiments of the present invention values of activity signals can undergo further data processing such as frequency analysis, correlation analysis, statistic analysis etc.

As e.g. the 3 blades of a rotor are all influenced by substantially the same environmental parameters such as temperature, wind loads, humidity etc. they should have equal basis as to work in and to withstand the impact from said environmental parameters. So if the impact is the same and the blades are in equal condition no essential difference in the response from the individual blade is to be expected.

By said cross comparison of values from e.g. three rotor blades it is possible to monitor if values from one blade change levels over time or suddenly, which may indicate a change in condition of said blade.

Figure 4A:
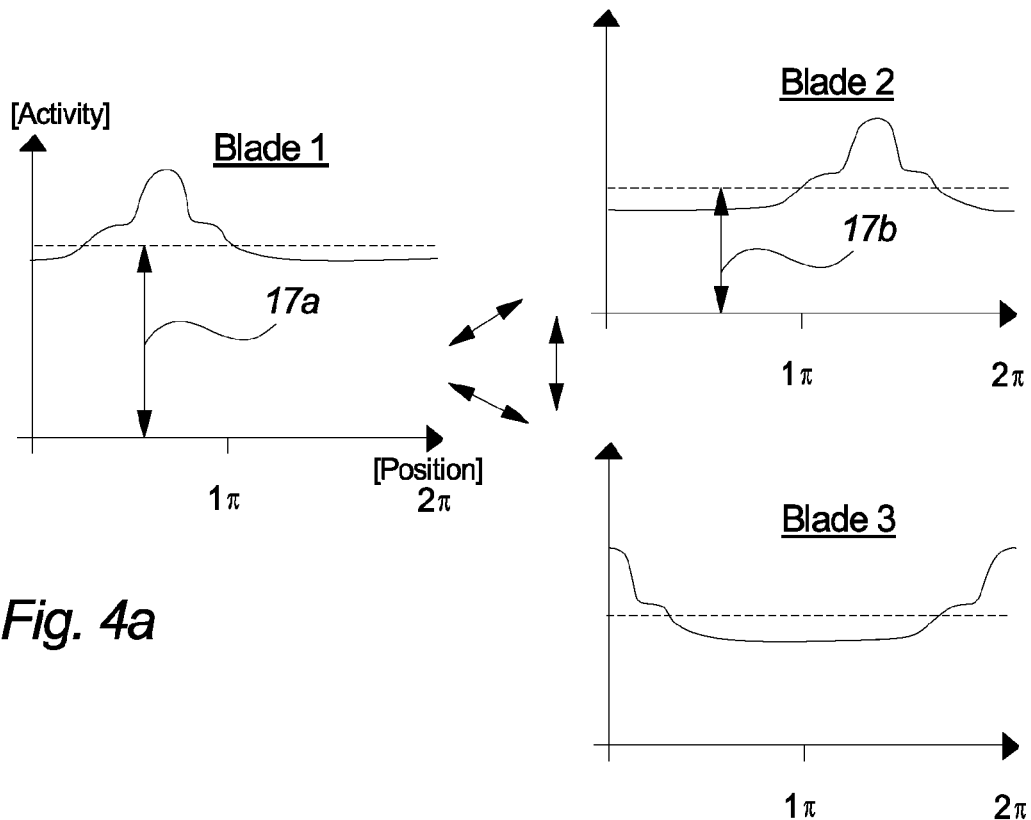
FIG. 4a illustrates examples of measured and established rotor values by the condition monitoring system.

FIG. 4a illustrates for one embodiment of the invention examples of measured and established rotor blade activity signal values by the condition monitoring system. The solid curve on the three graphs for blade 1, 2 and 3 respectively indicates the direct measured time related values of activity. It can be seen that as the blades undergoes substantially the same environmental loads during one rotational turn of the rotor i.e. the curve forms are substantially equal, but as the blades are placed ⅔π in relation to each other, the measured values are time delayed to each other accordingly.

The dotted curves on the graphs illustrate a secondary calculated value such as a time average of the measured activity signals.

Figure 4B:
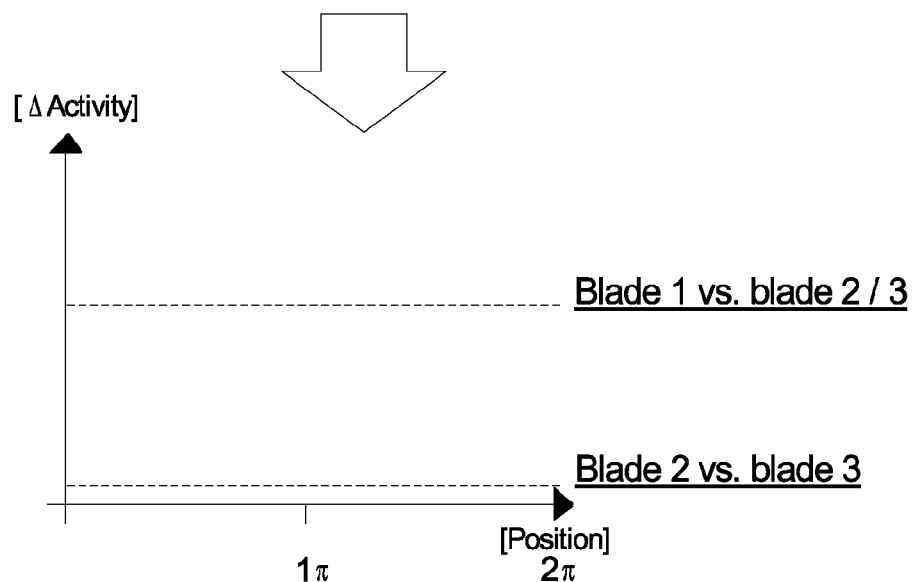
FIG. 4b illustrates as an example the result of a comparison+between values of blade 1, values of blade 2 and values of blade 3.

FIG. 4b illustrates, for the measured values of condition in FIG. 4a, a comparison of the signals taking into account the time shift between signals. As illustrated in FIG. 4a, the solid curves of blade 1, 2 and 3 are substantially equal regarding curve form and AC-amplitude, and therefore a comparison, as in this case a subtraction, of the signals may give a substantially 0-value result. By on the contrary comparing (subtracting) said secondary values, this example indicates that the average condition level of blade 1 is essential higher than blade 2 and 3. This in turn indicates a possible negative condition on blade 1 and blade 1 could hereby be e.g. pitch controlled correspondingly by the rotor controller.

Figure 5:
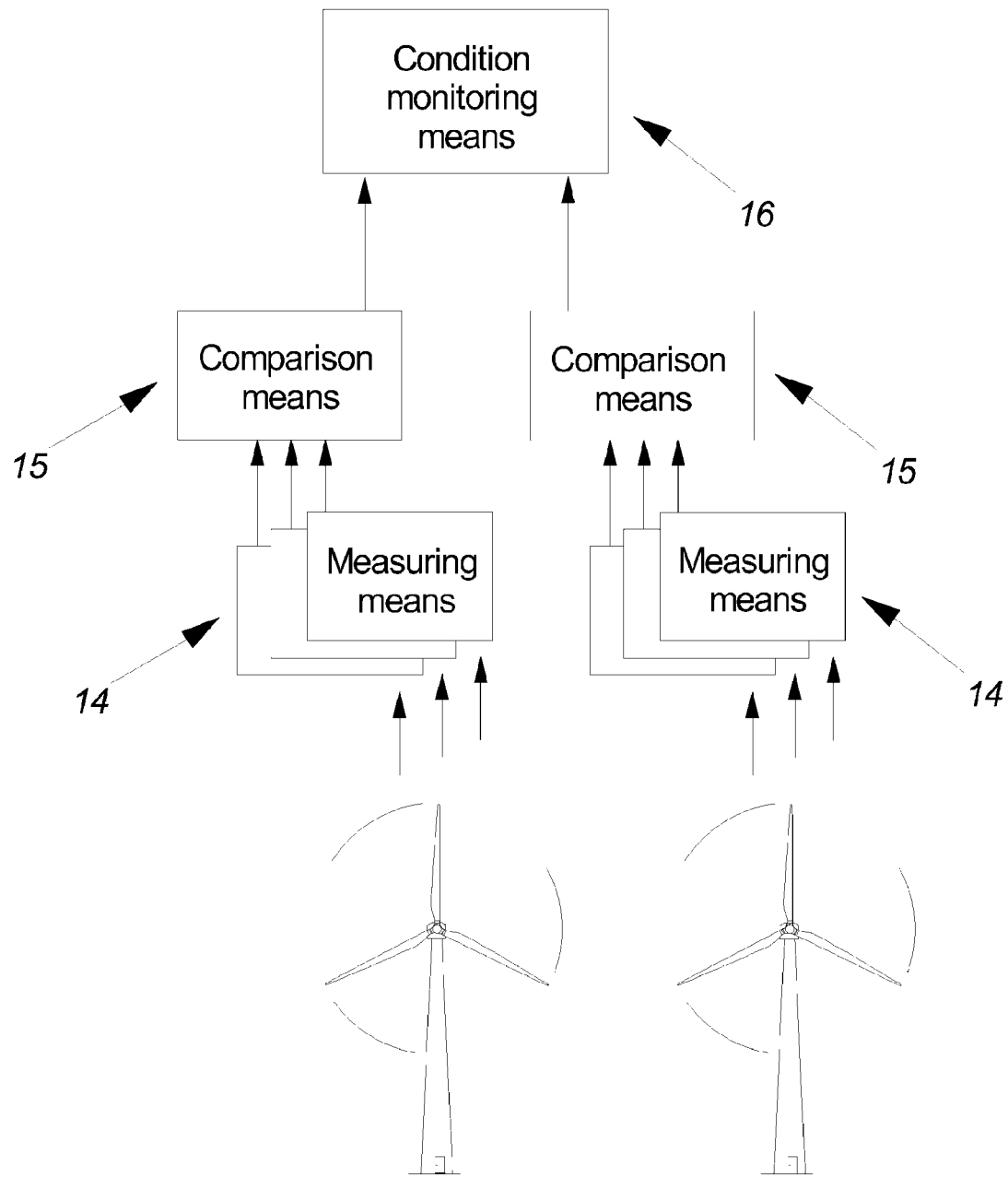
FIG. 5 illustrates an embodiment of a condition monitoring system for a cluster of wind energy plants.

FIG. 5 illustrates an embodiment of a distributed condition monitoring system for a cluster of wind energy plants. For this specific embodiment of the invention, a central conditioning monitoring means 16 receives information, or values, of the conditions from each wind energy plant in a cluster. The conditions are measured and compared as previously described.

It is also possible to perform any processing of the measured data centrally e.g. after having received the raw measured values from the wind energy plants in the cluster.

Figure 6:
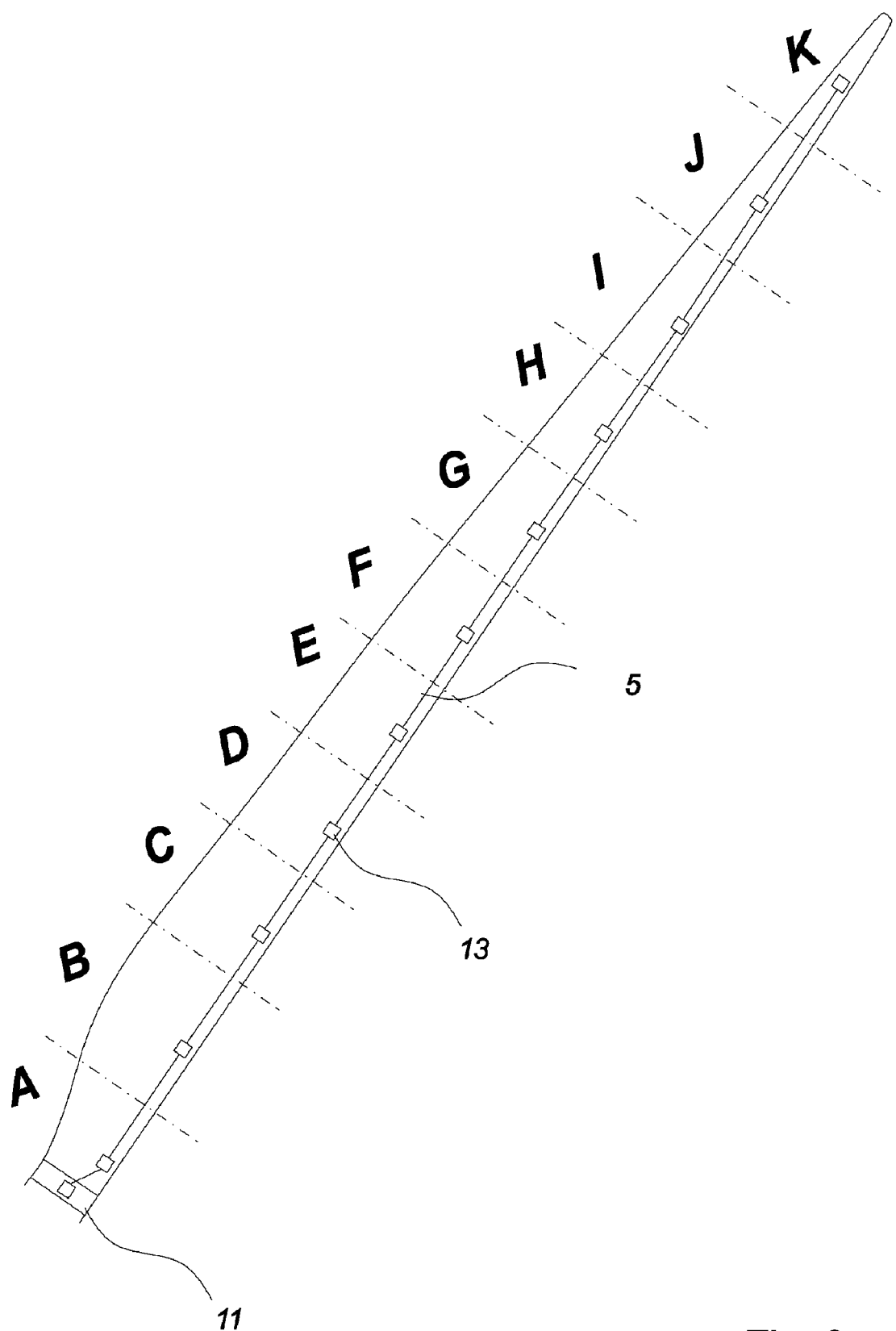
FIG. 6 illustrates an embodiment of positioning connected acoustic emission measuring means in a wind turbine rotor blade.

FIG. 6 illustrates schematically an embodiment of positioning connected acoustic emission measuring means in a wind turbine rotor blade. As to monitor the acoustic emission from distributed structures of e.g. a rotor blade 5, acoustic emission measuring means 13 such as acoustic emission sensors or structure coupled microphones can for one embodiment of the invention, be distributed in a row, substantially equally spaced along the longitudinal axis of said rotor blade 5. Hereby each measuring means 13 receives acoustic signals that are originated primarily in its vicinity as indicated on the figure by dividing the blade into subsections A to K.

It should be interpret that measuring means 13, e.g. located in section D of the blade, receives acoustic signals from neighbor sections such as C and E respectively, but as the generated signals are attenuated over distance, the primary content of the signal measured by means 13 in section D originates from within this area.

For other embodiments of the invention a plurality of rows of measuring means 13 can be integrated in said rotor blade.

For various embodiments of the invention the positioning of connected measuring means 13 can be e.g. at the trailing or leading edge or suction or pressure side of a rotor blade 5.

In even further embodiments of the invention said measuring means 13 are established on one or more rotor blade pitch bearings 11, whereby activity signals from said bearings 11 can be obtained as to monitor their condition.

Figure 7:
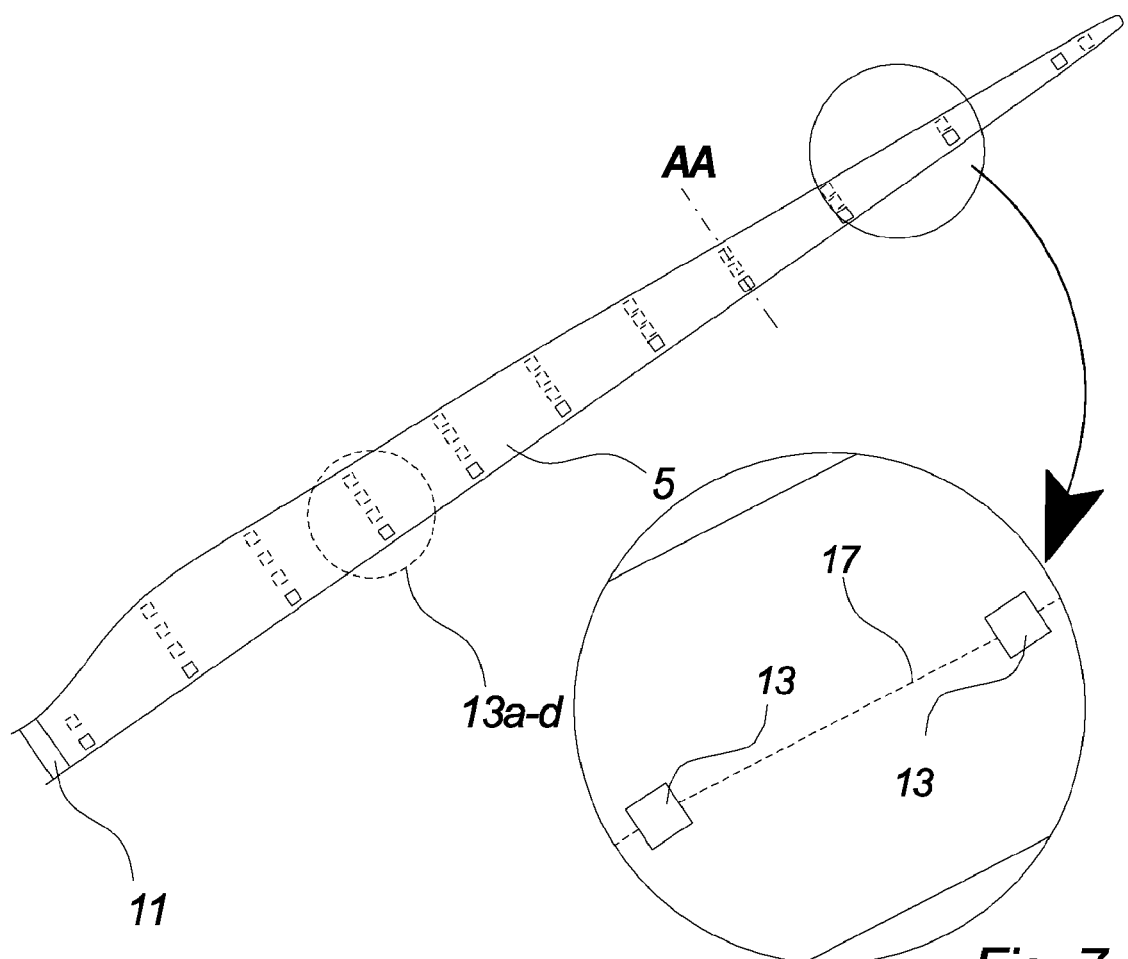
FIG. 7 illustrates schematically an embodiment of positioning connected acoustic emission measuring means in rows.

FIG. 7 illustrates an embodiment of the invention where a plurality of rows of connected measuring means 13 are established in a rotor blade 5.

By establishing a high number of measuring means 13 distributed over the entire rotor blades 5, it is possible to obtain a high resolution of monitoring the condition of the blades whereby information regarding the substantially exact location of e.g. a negative condition in a relative narrow section of the rotor blade 5 can be established.

As indicated on the figure, sensors 13 are connected by sensor connection means 17 such as a fiber optic cable, a multi cable etc. where said cables normally are shielded.

Figure 8:
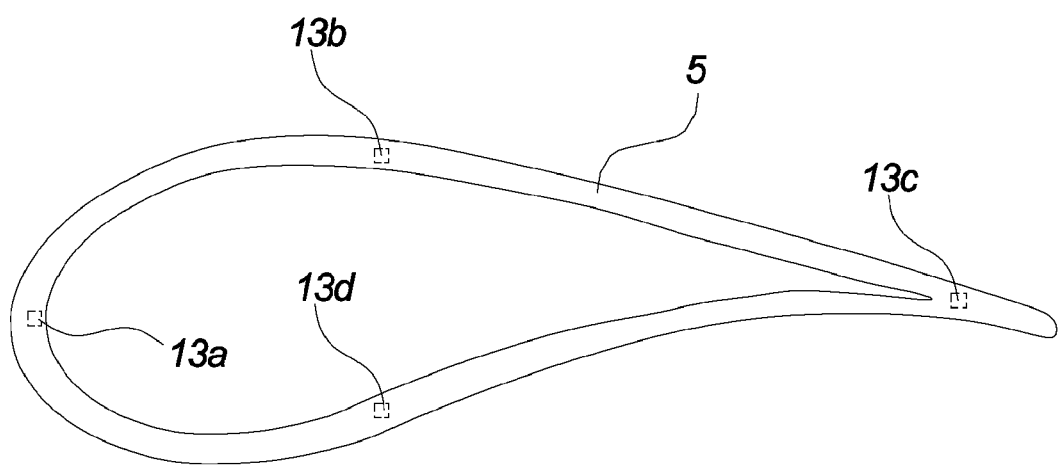
FIG. 8 illustrates a cross-section view of a wind turbine rotor blade comprising rows of connected acoustic emission measuring means.

FIG. 8 illustrates schematically for one embodiment or the invention a cross-section view AA of the rotor blade illustrated in FIG. 7 comprising said plurality of rows of measuring means. As for this embodiment measuring means 13a-d are located in the trailing and leading edge and on the suction and pressure sides of the rotor blade 5.

Furthermore values obtained by measuring means 13 and/or values calculated by comparison means 15 can for even further embodiments undergo further data processing such as frequency analysis, correlation analysis, statistic analysis etc. as to indicate the condition of the rotor blades 5.

The invention described has been exemplified above with reference to specific examples of the sensors. However, it should be understood that the invention is not limited to the particular examples but may be designed and altered in a multitude of varieties within the scope of the invention as specified in the claims e.g. with other types of sensors.

What is claimed is:

1. A method for monitoring a health condition of a rotor of a wind energy plant, said method comprising the steps of:
measuring activity signals of blades in said rotor,
establishing differential values between the activity signals of different blades, and
wherein the differential values are used for monitoring the health condition of the rotor in the wind energy plant.

2. The method according to claim 1, wherein the activity signals are measured with acoustic sensors in contact with structural means of the rotor.

3. The method according to claim 2, where said structural means of the rotor comprises one or more rotor blade pitch bearings.

4. The method according to claim 1, where said monitoring is performed continuously, with predefined intervals and/or initiated in response to a detected abnormal situation.

5. The method according to claim 4, where the abnormal situation is detected in at least one physical work property of at least one component of said wind energy plant.

6. The method according to claim 1, where the activity signals are averaged or integrated over a time period before differential values are established.

7. The method according to claim 1, where the activity signals are time delayed before differential values are established.

8. The method according to claim 1, where said differential values are compared with a predefined value in order to establish whether the blades have similar activity signals or not.

9. The method according to claim 8, where a number of acoustic sensors measures a condition of a blade when a differential value is above the predefined value for said blade.

10. The method according to claim 1, where comparison between all differential values are performed.

11. A method for controlling a rotor of a wind energy plant on the basis of a health condition of the rotor, said method comprising the steps of:
measuring activity signals of blades in said rotor, and
establishing one or more differential values between the activity signals of different blades,
wherein said one or more differential values are used for controlling at least one of loads on rotor blades and loads on pitch bearings of the rotor in the wind energy plant.

12. A wind energy plant comprising
a wind energy plant rotor including at least two blades,
one or more acoustic sensors positioned in contact with strengthening structure of the blades for measuring activity signals of said blades, and
means for establishing one or more differential values by comparison between said activity signals,
wherein said wind energy plant further comprises means for controlling the rotor of the wind energy plant on the basis of said established differential values.

13. The wind energy plant according to claim 12 wherein one or more acoustic sensors are positioned in each blade of the wind energy plant rotor.

14. The wind energy plant according to claim 12 wherein one or more acoustic sensors are positioned in a hub of the wind energy plant rotor.

15. The wind energy plant according to claim 12 wherein each blade comprises a plurality of acoustic sensors.

16. The wind energy plant according to claim 12 wherein each blade comprises rows of connected acoustic sensors.

17. The wind energy plant according to claim 16, wherein a row substantially extends from a blade root to a blade tip.

18. The wind energy plant according to claim 16 wherein a row is distributed in a region of a trailing and leading edge and a suction and pressure side, respectively.

19. The wind energy plant according to claim 12 wherein said means for controlling is part of a wind energy plant control system.

20. The wind energy plant according to claim 19 wherein said wind energy plant control system individually pitches the blades in response to said differential values between the blades.

21. The wind energy plant according to claim 12 wherein said plant comprises means for comparison between all differential values.

22. A cluster of wind energy plants comprising at least two wind energy plants according to claim 12.

23. The cluster of wind energy plants according to claim 22 wherein the wind energy plants are controlled by a distributed control system.

* * * * *

UNITED STATES PATENT AND TRADEMARK OFFICE
CERTIFICATE OF CORRECTION

| | | |
|---|---|---|
| PATENT NO. | : 7,887,292 B2 | Page 1 of 1 |
| APPLICATION NO. | : 12/560831 | |
| DATED | : February 15, 2011 | |
| INVENTOR(S) | : Kuhlmeier | |

It is certified that error appears in the above-identified patent and that said Letters Patent is hereby corrected as shown below:

On Title Page

Page 1, insert

-- Related U.S. Application Data

(63) Continuation of application No. PCT/DK2008/000108, filed on March 14, 2008

Foreign Application Priority Data

(30) March 16, 2007 (DK)....................... PA 2007 00403 --

Signed and Sealed this
Seventh Day of June, 2011

David J. Kappos
*Director of the United States Patent and Trademark Office*